United States Patent
Donnelly

(10) Patent No.: US 7,918,955 B2
(45) Date of Patent: Apr. 5, 2011

(54) MANUFACTURE OF FLEXIBLE TUBULAR DUCT WITH IMPROVED CORE DELIVERY

(75) Inventor: William James Donnelly, Heidelberg (AU)

(73) Assignee: Nova-Duct Technologies Pty Ltd, Melbourne, Vic (AU)

( * ) Notice: Subject to any disclaimer, the term of this patent is extended or adjusted under 35 U.S.C. 154(b) by 897 days.

(21) Appl. No.: 11/579,006

(22) PCT Filed: Apr. 29, 2005

(86) PCT No.: PCT/AU2005/000622
§ 371 (c)(1),
(2), (4) Date: Aug. 20, 2007

(87) PCT Pub. No.: WO2005/106315
PCT Pub. Date: Nov. 10, 2005

(65) Prior Publication Data
US 2008/0060713 A1   Mar. 13, 2008

(30) Foreign Application Priority Data
Apr. 30, 2004 (AU) ............................... 2004902301

(51) Int. Cl.
*B29C 53/64* (2006.01)
(52) U.S. Cl. ......... 156/143; 156/192; 156/279; 156/429
(58) Field of Classification Search ................... 156/143, 156/191–192, 195, 201, 279, 429, 433, 438, 156/446; 138/122, 125, 131, 133, 149
See application file for complete search history.

(56) References Cited

U.S. PATENT DOCUMENTS

| | | | | |
|---|---|---|---|---|
| 2,874,722 A |   | 2/1959 | Hamblin | |
| 3,093,532 A | * | 6/1963 | Miller et al. | 156/430 |
| 3,406,231 A | * | 10/1968 | Ullman et al. | 264/145 |
| 3,498,862 A | * | 3/1970 | Comastri et al. | 156/195 |
| 3,515,610 A | * | 6/1970 | Comastri et al. | 156/62.8 |
| 3,843,435 A | * | 10/1974 | Strom | 156/143 |
| 5,607,529 A | * | 3/1997 | Adamczyk et al. | 156/143 |
| 6,409,897 B1 |   | 6/2002 | Wingo | |
| 6,676,173 B2 |   | 1/2004 | Donnelly | |
| 2003/0188792 A1 | * | 10/2003 | Donnelly | 138/122 |
| 2010/0269944 A1 | * | 10/2010 | Wilson et al. | 138/129 |

FOREIGN PATENT DOCUMENTS

| | | |
|---|---|---|
| DE | 1 629 819 | 1/1971 |
| EP | 0 025 971 | 5/1983 |
| EP | 1400344 | 3/2004 |
| JP | 56-101832 | 8/1981 |
| JP | 11-248055 | 9/1999 |
| JP | 11-286058 | 10/1999 |
| SU | 1750785 A1 | 7/1992 |

\* cited by examiner

*Primary Examiner* — Jeff H Aftergut
*Assistant Examiner* — David Simmons
(74) *Attorney, Agent, or Firm* — Greer, Burns & Crain, Ltd.

(57) ABSTRACT

An apparatus for manufacturing a flexible tubular duct includes a mandrel, and a substrate feeding assembly for feeding a strip of flexible substrate material to the mandrel. Apparatus is provided for bending the strip of substrate material to have a rounded encapsulating portion, into which is fed a stream of loose fibrous insulating material. A mechanism is further provided for delivering an elongate reinforcing element onto the strip of flexible substrate material. In operation, the rounded encapsulating portion and the reinforcing element are wound in a helical path around the mandrel so that the loose fibrous material is encapsulated as a core in the helically wound rounded encapsulating portion the reinforcing element is also encapsulated by the strip of substrate material, whereby to form a reinforced flexible tubular duct.

8 Claims, 4 Drawing Sheets

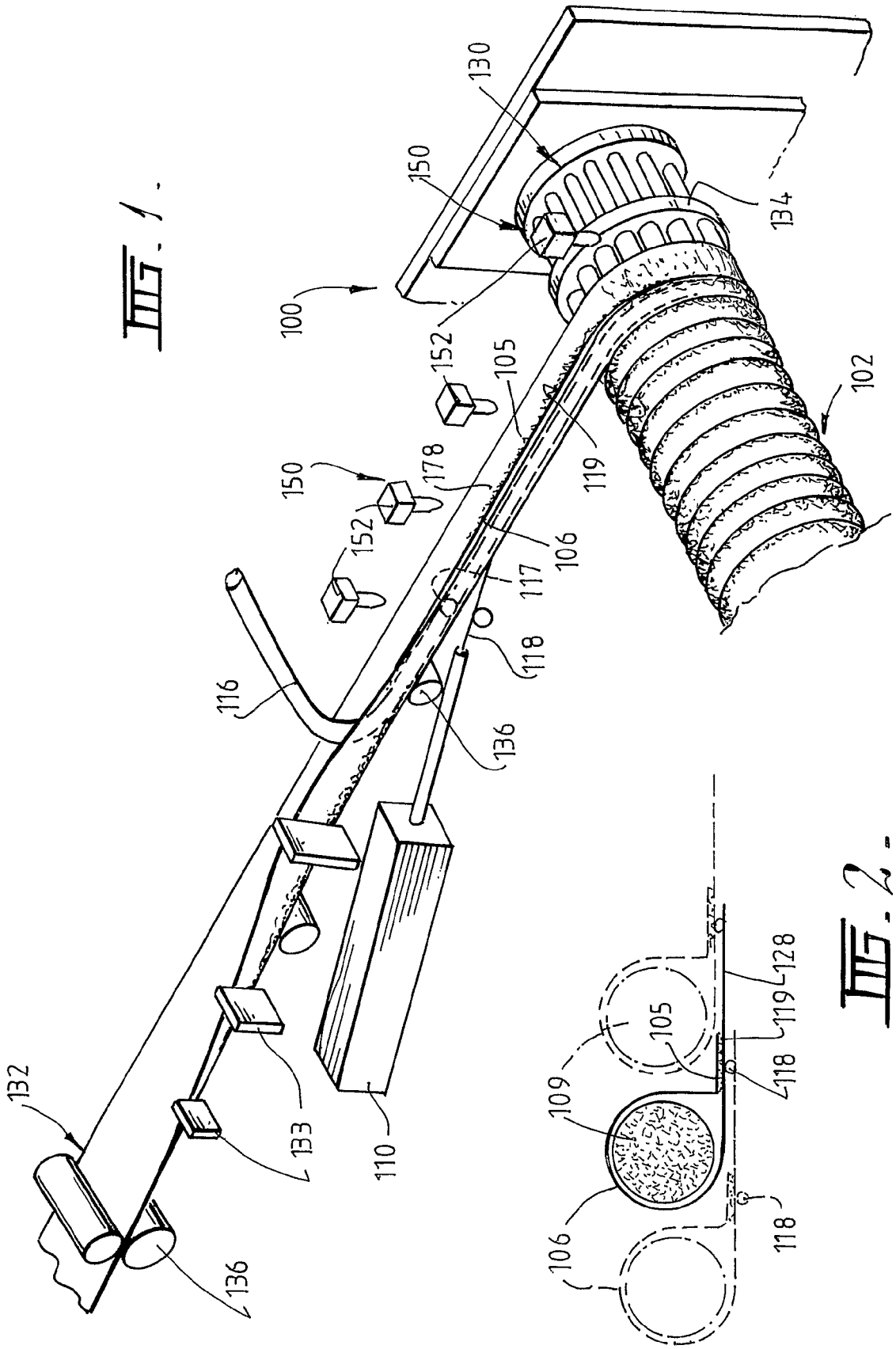

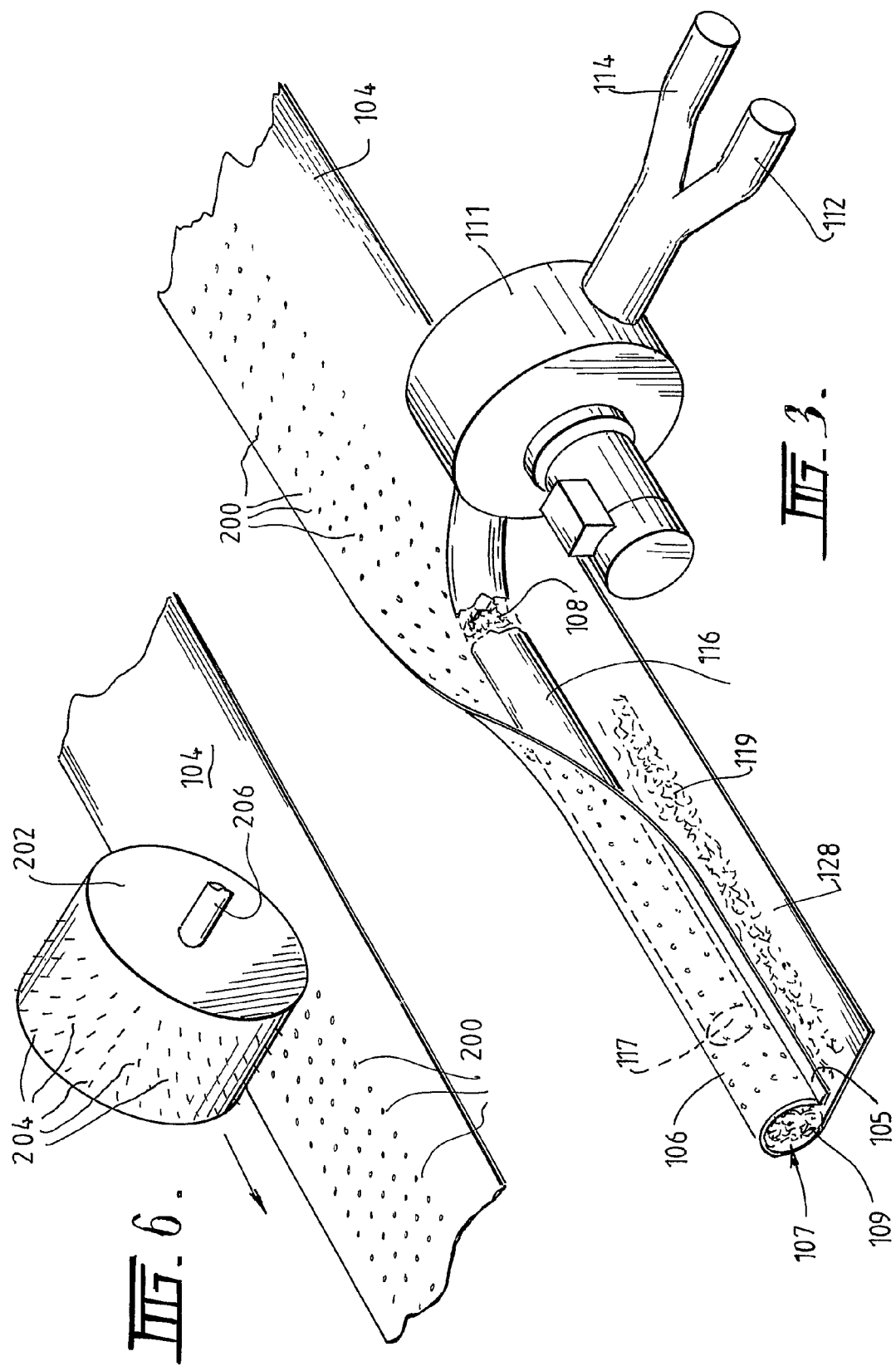

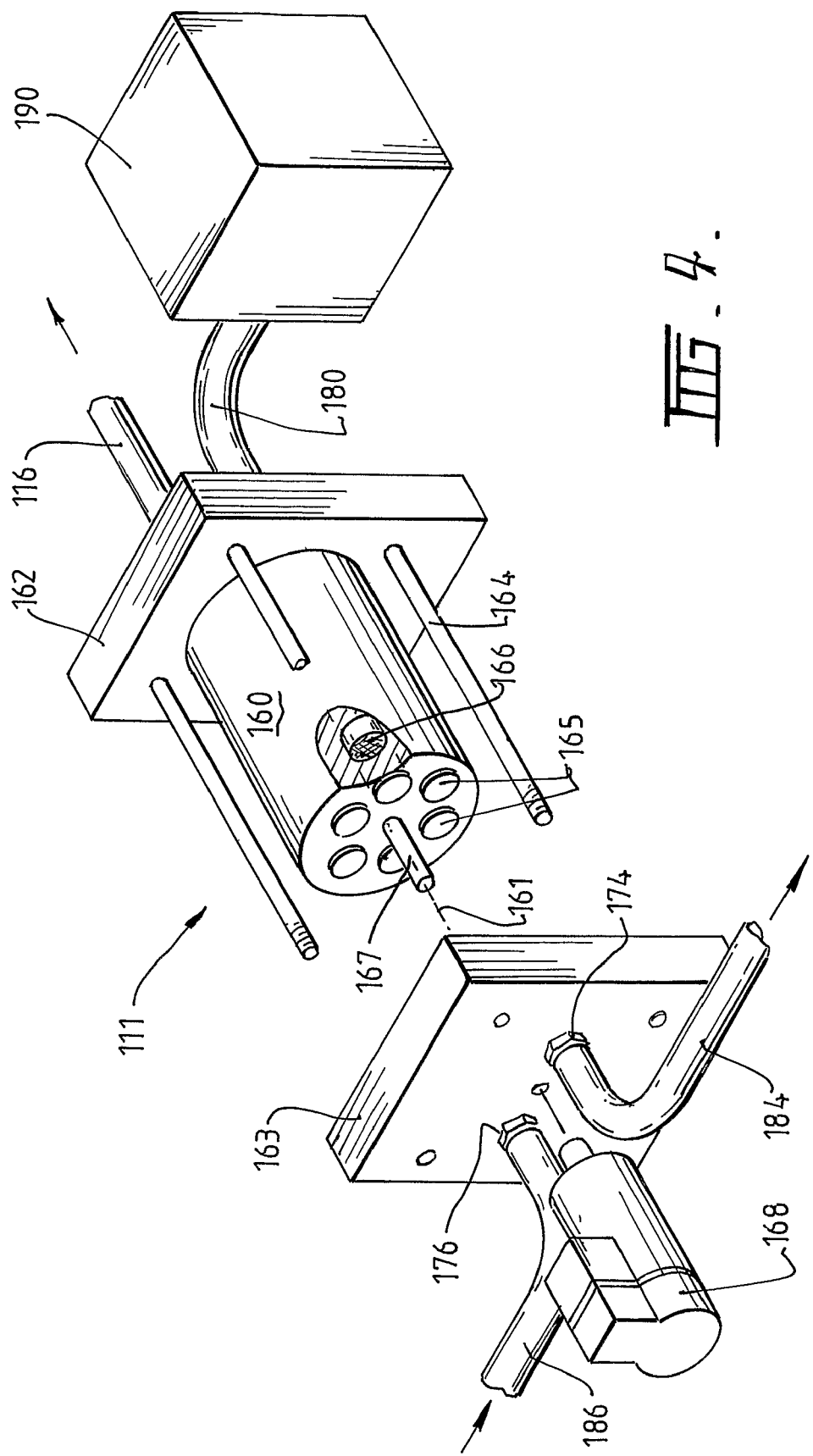

MANUFACTURE OF FLEXIBLE TUBULAR DUCT WITH IMPROVED CORE DELIVERY

FIELD OF THE INVENTION

This invention relates to ducting and, more particularly, to the manufacture of flexible tubular duct such as duct of the kind suitable for use in ducted heating and air conditioning systems. The invention provides a method of and apparatus for manufacturing such ducting, as well as a novel flexible tubular duct.

BACKGROUND OF THE INVENTION

For a number of years, flexible ducting for heating and air conditioning systems has been manufactured by helically laminating a polymer strip material with a wire reinforcement to form a tube. The wire reinforcement ensures roundness integrity, and the tube is substantially non-insulating. Thermal insulation is provided by a soft blanket made from fibreglass or polymer based fiber, wrapped about the tube and secured with an outer sheath of polymer film or aluminium tube material. The insulation blanket and the securing outer sheath are generally applied manually as a secondary manufacturing process, with the aid of appropriate jigs and fixtures.

This style of ducting is still predominant. However, with the increasing load of air conditioning systems on electricity supply grids, and a general desire for more thermally efficient systems, there has been a need to develop ducting with improved thermal protection.

To address this need, Australian patent 773565 discloses a flexible tubular duct that comprises a strip of flexible substrate material with a rounded portion that encapsulates a solid core of insulating material and is helically wound to form the tubular duct. The core is cylindrical in shape and is a sliver or continuous length of insulation material. The tubular duct also includes a helically wound reinforcement element which is encapsulated by the strip of substrate material in the tubular duct.

The duct construction of patent 773565 exhibits good thermal insulation properties, and is efficiently formed with its insulation in a single automatic manufacturing operation.

It is an object of the invention to provide one or more improvements in the manufacture of flexible tubular duct such as duct of the kind disclosed in patent 773565.

It is a further object of the invention to provide an improved flexible tubular duct.

SUMMARY OF THE INVENTION

The present invention is directed to providing the encapsulated core of insulating material as a mass of fibrous material fed as a stream of loose fibrous material into the encapsulating portion of the substrate material.

More particularly, the present invention provides, in one aspect, a method of manufacturing a flexible tubular duct. The method includes feeding an elongate strip of flexible substrate material to a winding station while bending the strip to have a rounded encapsulating portion, feeding a stream of loose fibrous insulating material into the rounded encapsulating portion, and delivering an elongate reinforcing element onto the strip of flexible substrate material. The rounded encapsulating portion and the reinforcing element are wound at the winding station in a helical path such that the loose fibrous material is encapsulated as a core in the helically wound rounded encapsulating portion and the reinforcing element is also encapsulated by the strip of substrate material, whereby to form a reinforced flexible tubular duct.

In a preferred embodiment, the step of feeding a stream of loose fibrous material includes entraining the material in a gas stream. Preferably, the gas stream is delivered via a delivery tube. The delivery tube may be arranged to define a core cavity in the rounded encapsulation portion into which the loose fibrous material is blown.

Advantageously, the gas stream maintains the core cavity downstream of the tube, and also assists in internally supporting and maintaining the core cavity during winding. To further maintain the core cavity during winding, heat may be applied to stretch the outer surface of the rounded encapsulating portion as it is wound. The flexible substrate material is preferably perforated in the encapsulating portion to facilitate maintenance of the core cavity by allowing gas to pass from the cavity.

The loose fibrous material is advantageously insulating material.

The present invention also provides, in another aspect, apparatus for manufacturing a flexible tubular duct. The apparatus includes a mandrel, and substrate feeding means for feeding a strip of flexible substrate material to the mandrel. Respective means are provided for bending the strip of substrate material to have a rounded encapsulating portion, and for feeding a stream of loose fibrous insulating material into the rounded encapsulating portion. Means is further provided for delivering an elongate reinforcing element onto the strip of flexible substrate material. In operation the rounded encapsulating portion and the reinforcing element are wound in a helical path around the mandrel so that the loose fibrous material is encapsulated as a core in the helically wound rounded encapsulating portion and the reinforcing element is also encapsulated by the strip of substrate material, whereby to form a reinforced flexible tubular duct.

In a preferred embodiment, the means for feeding a stream of loose fibrous material comprises a delivery tube for a gas stream in which the loose fibrous material is entrained. The delivery tube is preferably arranged to define a core cavity in the rounded encapsulating portion, through which cavity the gas stream is blown. Alternatively, the gas stream may be provided to the rounded encapsulating portion separate from the delivery of the loose fibrous material.

The apparatus may further include means for perforating the strip of flexible substrate material to facilitate maintenance of the core cavity by allowing gas to pass from the cavity.

Preferably, means is provided to apply heat to stretch the outer surface of the rounded encapsulating portion as it is wound. Such means many include an array of heater elements arranged to blow heated air at predetermined temperatures onto the rounded encapsulating portion before and after it enters said helical path.

In a preferred embodiment, the apparatus also includes means for applying adhesive to the strip of substrate material to adhere the portion of the substrate material forming the rounded encapsulating portion to itself.

Advantageously, the apparatus further includes an air and fiber pump connected to supply the gas stream and loose fibrous material entrained therein, the pump receiving the fibrous material and transferring it into the gas stream. This pump may comprise an element such as e.g., a rotatable drum, having a plurality of chambers, which element is moveable between a first station at which the chambers receive respective tufts of the fibrous material travelling in a first path, and a second station at which the tufts are ejected into the gas stream travelling in a second path.

The present invention further provides, in a still further aspect, a flexible tubular duct comprising a strip of flexible substrate material formed to have a rounded encapsulating portion which encapsulates a core of fibrous material. The rounded encapsulating portion is helically wound to form the tubular duct. The tubular duct also include a helically wound reinforcing element which is encapsulated by the strip of substrate material in the tubular duct.

The invention still further provides an apparatus for delivering a gas stream, with loose fibrous material entrained therein, comprising an element having a plurality of chambers, which element is moveable between a first station at which the chambers receive respective tufts of the fibrous material travelling in a first path, and a second station at which the tufts are ejected into the gas stream travelling in a second path.

BRIEF DESCRIPTION OF THE DRAWINGS

The present invention will now be further described, by way of example only, with reference to the accompanying drawings, in which:

FIG. 1 is a layout diagram of apparatus for forming a flexible tubular duct in accordance with a preferred embodiment of the invention;

FIG. 2 is a fragmentary cross-sectioned diagram showing three successive windings in a duct formed with the apparatus of FIG. 1;

FIG. 3 is a diagram depicting the delivery of the fibrous insulation core in the apparatus of FIG. 1;

FIG. 4 is a partially exploded and partly sectioned view of an air and fiber pump suitable for use in the apparatus of FIGS. 1 and 3;

FIG. 6 is a diagram showing an exemplary device for perforating the strip of flexible substrate material.

EMBODIMENTS OF THE INVENTION

Figure 5:
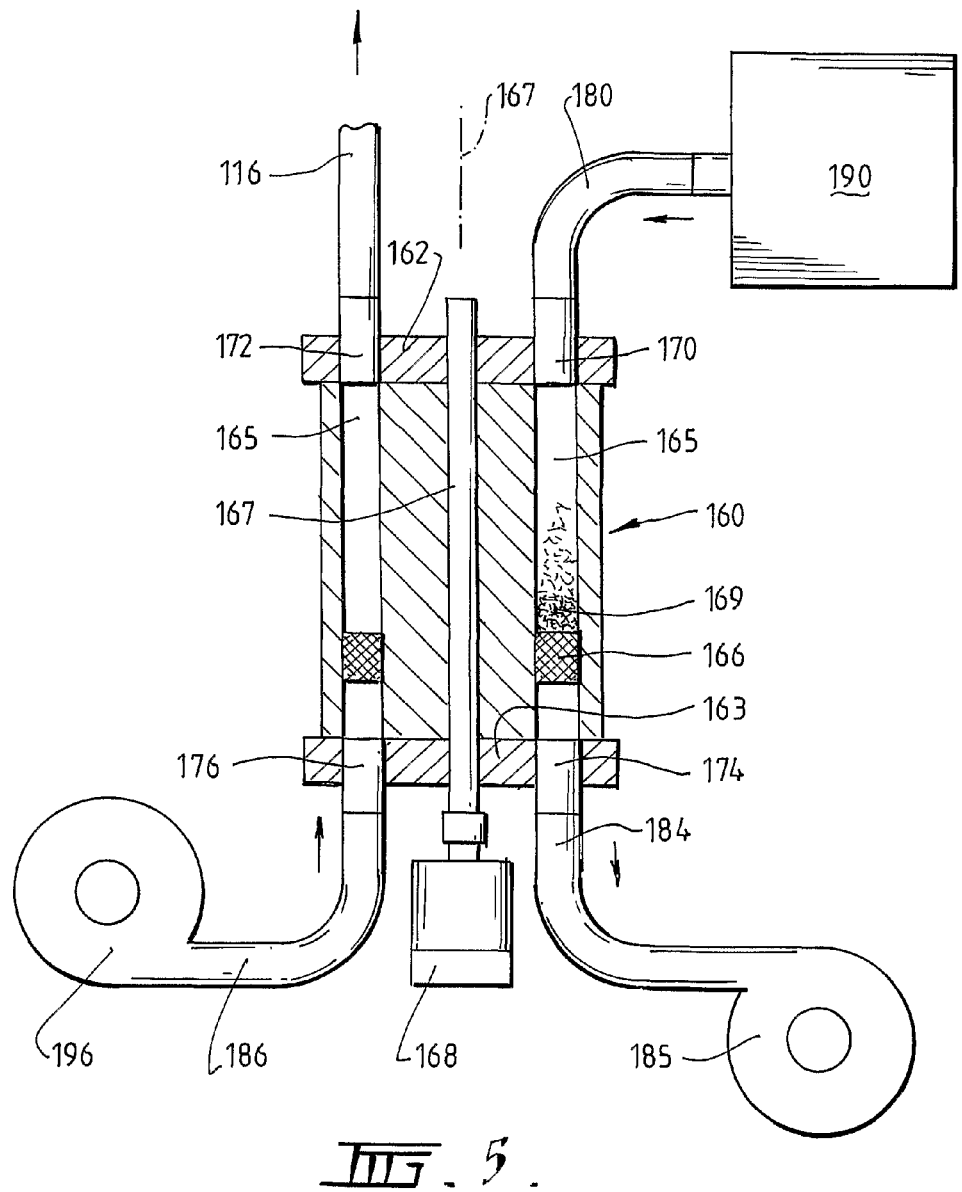
FIG. 5 is an axial cross-section view of the pump of FIG. 4.

FIG. 1 shows an apparatus 100 for manufacturing flexible tubular duct 102 in accordance with an embodiment of the invention. Apparatus 100 includes a winding station 130 having a mandrel 134 to which a strip 104 of flexible substrate material is fed, from a reel or other supply of the material, and helically wound, in a manner to be described, to form flexible tubular duct 102. Substrate feeding means 132 for feeding strip 104 to mandrel 134 comprises suitable guide structure depicted in FIG. 1 purely by representative diagram elements 136. Structure 136 also carries means 133 for bending the strip 104 to form a rounded encapsulating portion 106 of initial cross-section determined by a delivery tube 116 about which the strip is wrapped.

A core cavity is defined by delivery tube 116, downstream of the mouth 117 of the tube. A stream 108 (FIG. 3) of loose fibrous insulating material is continuously fed via delivery tube 116 from blower or pump 111 (FIG. 3). This stream 108 forms an insulating core 109 encapsulated by rounded portion 106 of strip 104. Rounded portion 106 is formed by only part of the width of strip 104: the balance remains substantially flat and defines a tail portion 128, so that the strip assumes the appearance of a P-shape in cross-section (FIG. 2). The folded-over rounded portion 106 terminates in an edge lip 105 that folds out flat onto tail portion 128.

The third principal component of the duct is an elongate reinforcement element in the guise of a wire 118 that is delivered, by means 110 including suitable wire guides, against and under portion 128 so as to lie parallel to strip 104 and rounded portion 106.

The assembly of strip 105, wire 118 and rounded portion 106 encapsulating insulating core 109, is wound up helically on mandrel 134 so that successive windings abut and combine to form flexible duct 102. Duct 102 is formed such that the helix spacing is less than the external diameter of the core 109 of encapsulated loose fibrous material 108. The duct has somewhat of the appearance of a lobster tail. The rounded encapsulating portion 106 of each successive winding overlies and abuts the tail portion 128 of the previous winding, and wire 118 is encapsulated between these two successive tail portions. An adhesive film 119 applied to the strip 104 by a suitable applicator, ensures that the edge lip 105 of the rounded encapsulating portion is adhered to its own tail portion at adhesive film 119, and that the rounded portion of the next winding is adhered to that tail portion. The successive windings might alternatively be adhered together by employing microwave welding or other heat sealing techniques.

The winding duct-formation process is generally similar to that described in patent 773565 (to which reference is here made for further detail), except that there the insulating core comprises a sliver of insulating material.

Reverting to the manner of delivering the loose fibrous material 108 comprising insulating core 109, blower or pump 111 (FIG. 3) is an air/fibre feed pump to which gas, typically air, is drawn in via gas inlet duct 186, while fiber is received at fiber intake duct 180 and entrained in the air stream within the pump. The air stream and its entrained mass of fiber is then delivered by the pump along delivery tube 116.

The detail of air/fibre feed pump 111 is illustrated in FIGS. 4 and 5. Pump 111 is designed both to maintain an air stream of sufficient flow and pressure to expand rounded encapsulating portion 106 and to provide an adequate density of fibers entrained in the air stream. To this end, pump 111 defines separate fiber and air circuits, and transfers fibers to the air stream via multiple transfer chambers 165 in a rotating cylindrical drum 160.

More particularly, pump 111 has a pair of end plates 162, 163 coupled by tie bars 164 or similar. Drum 160 is supported for rotation between end plates 162, 163, by an axle 167 journalled in suitable roller or sleeve bearings in the end plates. Axle 167, and therefore drum 160, is rotatable by motor 168.

Drum 160 has a number of similarly dimensioned, open-ended, cylindrical chambers 165. Chambers 165 are parallel to the axis 161 of drum 160 and are equi-angularly spaced about the axis. At similar radial centres in end-plates 162, 163, so as to be momentarily in register with chambers 165 as they pass, are ports 170, 172 and 174, 176 respectively. Ports 170, 172 in end-plate 162 comprise one or more fiber inlet ports 170 and a single pressurized or outlet port 172. Ports 174, 176 in end-plate 162 comprise one or more vacuum ports 174 aligned with fiber inlet ports 170, and a pressurized air intake port 176 aligned with port 172.

Port 170 is coupled by duct 180 to a conventional textile fiber opener represented at 190. Port 174 is connected via duct 184 to a vacuum pump 185. Port 176 connects via duct 186 to a suitable air blower, eg. compressor 196, and port 172 is coupled to fiber and air delivery tube 116.

Each chamber 165 has a filter 166 sufficient to retain fiber in the chamber but not to significantly block airflow, and the chambers are spaced circumferentially by a distance less than their diameter so that before each chamber 165 has fully crossed an aligned pair of ports 170, 174, the next chamber will also be connecting the ports. In this way, as the drum rotates vacuum pump 185 is connected via duct 184, one or more chambers 165, and duct 180 to the fiber opener, thereby defining a first path along which fibers are continually drawn into chambers 165, where they accumulate as tufts 169 against filters 166. These tufts 169 are then expelled into delivery tube 116 as the respective chambers momentarily couple ports 176, 172, defining a second path in which the gas stream travels. Because the air/fibre delivery speed is much greater than the speed of delivery of strip 104, the tufts 169 re-contact and from a continuous entrained fiber stream in tube 116.

Some degree of air sealing between rotating drum 160 and end plates 162, 163 may be provided by teflon bushes (not shown) that project from both ends of chambers 165 to brush the end-plates, but complete hermetic sealing is not important, or indeed desirable, in the vacuum circuit.

It will be appreciated that as the rounded encapsulating portion 106 begins to wind about the mandrel, the inner and outer diameters of the portion 106 will differ and the portion will therefore tend to flatten and compress the fibrous core within. The portion 106 is, however, kept satisfactorily expanded by a balanced combination of air pressure within, delivered by pump 111, and stretching of the radially outer side of rounded encapsulating portion 106. The air pressure is balanced within by multiple perforations 200 in the strip material, of a size and spacing to determine the rate of outflow, while the stretching is achieved by an overhead heater array 150 that softens the material of the encapsulating portion sufficiently for it to stretch as the assembly is wound.

Heater array 150 comprises a sequence of at least three heater elements 152 (four or five heater elements 152 provide optimal heating) spaced above the rounded encapsulating portion 106 and operable to blow heated air onto the radially outer side of rounded portion 106 (relative to the winding axis) before and after it enters its helical path. The last of the heater elements 152 is beyond the point at which rounded portion 106 starts its winding trajectory. The temperature of each downdraft of heated air is predetermined to achieve a controlled pre-heating or softening. The apparatus may also include infrared probes (not shown) for monitoring the temperature of the rounded encapsulating portion.

The blown-in air may also be pre-heated if desired or necessary.

The substrate material may take any suitable form, for example a polymeric plastics material such as polyester, polypropylene, polyvinyl chloride (PVC) or polyethylene. Alternatively, the strip may comprise a laminated or partially laminated material such as a metal/plastics laminate.

The reinforcement element is typically wire, eg. metal wire, preferably of spring-grade hardness.

The core 109 may be formed of insulating material, for example fibreglass, fibrous polyester or any other suitable fibrous material. Each fiber is itself a fine tube: a medium of such fibers exhibits high thermal insulating properties.

FIG. 6 illustrates one suitable means 201 for forming perforations 200 in the strip of flexible substrate material 104. This means includes a pin-wheel 202 having pins or spikes 204, rotatably mounted on shaft 206. As the strip of flexible substrate material 104 is fed towards the winding station 130, the wheel 202 rotates on shaft 206 to pierce the substrate 104 to create perforations 200.

Other means such as 'hot-pin' perforators or programmable laser perforators may similarly be employed. The number and dimension of the perforations 200 may be calculated, in conjunction with the air volume to be evacuated via the perforations, to maximize the accuracy and density of the selected volume of fibers contained within the rounded portion 106 of strip 104.

A significant advantage of the described arrangement is that the cross-sectional size of the rounded encapsulating portion and its insulating core can be selectively varied by modifying parameters such as the blown-in air pressure, the delivery rate of the fibrous material, the heater temperature and the cross-section or diameter of the delivery tube: in this manner the apparatus 100 is adaptable to produce duct of different specifications.

If desired, the fibrous material delivered along delivery tube 116 may include a small proportion of melt fibers that liquefy and disperse so as to glue some or most of the other fibers together.

The invention claimed is:

1. A method of manufacturing a flexible tubular duct, including:
    feeding an elongate strip of flexible substrate material to a winding station while bending the strip to have a rounded encapsulating portion;
    feeding a stream of loose fibrous insulating material into the rounded encapsulating portion;
    delivering an elongate reinforcing element to the winding station; and
    winding the rounded encapsulating portion and the reinforcing element at the winding station in a helical path such that the loose fibrous material is encapsulated as a core in the helically wound rounded encapsulating portion, whereby to form a reinforced flexible tubular duct.

2. The method according to claim 1, wherein the step of feeding a stream of loose fibrous material includes entraining the material in a gas stream, which assists in maintaining expansion of said encapsulating portion.

3. The method according to claim 2, wherein the gas stream is delivered via a delivery tube.

4. The method according to claim 3, wherein the delivery tube is arranged to define a core cavity in the rounded encapsulating portion into which the loose fibrous material is blown.

5. The method according to claim 2, wherein the gas stream maintains a core cavity downstream of the tube, and also assists in internally supporting and maintaining the core cavity during said winding.

6. The method according to claim 4, wherein the flexible substrate material is perforated in the encapsulating portion to facilitate maintenance of the core cavity by allowing gas to pass from the cavity.

7. The method according to claim 1, wherein heat is applied to stretch the outer surface of the rounded encapsulating portion as it is wound.

8. The method according to claim 1, wherein the loose fibrous material is insulating material.

* * * * *